Aug. 4, 1970 T. G. BROWN, JR 3,522,587

LINE SWITCHING APPARATUS

Filed Oct. 25, 1966 2 Sheets-Sheet 1

INVENTOR.
THOMAS G. BROWN, JR.
BY
[signature]
ATTORNEY

INVENTOR.
THOMAS G. BROWN, JR.
BY
Menotti J. Lombardi Jr.
ATTORNEY 3,522,587
LINE SWITCHING APPARATUS
Thomas G. Brown, Jr., Ridgewood, N.J., assignor to International Telephone and Telegraph Corporation, Nutley, N.J., a corporation of Delaware
Filed Oct. 25, 1966, Ser. No. 589,409
Int. Cl. H01l 5/00; H04q 1/00
U.S. Cl. 340—147 11 Claims

ABSTRACT OF THE DISCLOSURE

A high speed line searching apparatus is provided which automatically searches and selects along the lines the next lines requesting service without a cyclic search. The line searching apparatus includes line search logic means having multiplicity of input service lines, and a line address register means for addressing one of a multiplicity of data lines according to a request condition existing on one of the service request lines. Interconnecting the register and logic are two decoders, one decoder corresponding to the next line requiring service and the other decoder indicating to the line search logic the particular line being serviced at the present. The service of the service request line in the request condition is automatically accomplished according to the logic arrangement of the search logic means.

This invention relates to line searching apparatus, and more particularly to a high speed line searching apparatus which will automatically search and select among the lines the next line requesting service without a cyclic search.

In line switching terminals, it is necessary to search among the many lines entering the terminal to determine which one is to be given service at any particular instance. Although other arrangements are possible, one of the most common is to search cyclically. That is, after servicing the $i$th line, line $i+1$ is examined. If service is required, it is given; if not, line $i+2$ is examined, and so on. After the last line is handled then line 1 is examined. In this way all lines receive an equal grade of service.

One method of constructing such a system is as follows. There is a service request line associated with each data line; a "one" on the service request line indicates that the common equipment should service the data on the data line. All the service request lines are fed to an electronic switch, which is under the control of a line scan counter. At each clock time the counter advances cyclically by one state. If the switch output is one, the counter is stopped, and the line service. If the switch output is zero, the counter is advanced at the next clock time. The hardware for doing this is straightforward, but the approach is rather inefficient in its utilization of time. For example, suppose there are a large number of lines each of which is active only ten percent of the time. Then on the average the line searcher will waste nine clock times examining inactive lines before reaching an active line. This problem may be eliminated according to the invention.

Therefore, it is an object of this invention to provide high speed line searching apparatus which will automatically search and select among the lines the next line requesting service without a cyclic search.

Another object of this invention is to eliminate the time wasted for cyclic searching, in that when the apparatus advances, it immediately proceeds to the next active line.

According to the broader aspects of the invention, the line searching apparatus includes line search logic means having a multiplicity of input service lines, and a line address register means for addressing one of a multiplicity of data lines according to a request condition existing on one of the service request lines. Interconnecting the register and logic are two decoders, one decoder corresponding to the next line requiring service, and the other decoder indicating to the line search logic the particular line being serviced at the present. The service of the service request line in the request condition is automatically accomplished thereby according to the arrangement of the search logic means.

A feature of the circuit is that the logic means contains a chain of identical stages, one stage for each service and service complement line, and each stage including a pair of AND gates and an OR gate, such that a signal from one of the decoders will pass through each stage unless inhibited by a request condition existing on the associated service request line.

Another feature of this invention is that a plurality of stages form a group, and each group further includes a bypass AND gate and means for controlling the bypass AND gate, wherein the control means will enable the bypass AND gate in the absence of all signals to a particular group to provide a bypass around a group or a number of groups. This will shorten the maximum time required and provide the ultimate in high speed operation.

The above mentioned and other features and objects of this invention will become more apparent by reference to the following description taken in conjunction with the accompanying drawings, in which.

Figure 1:
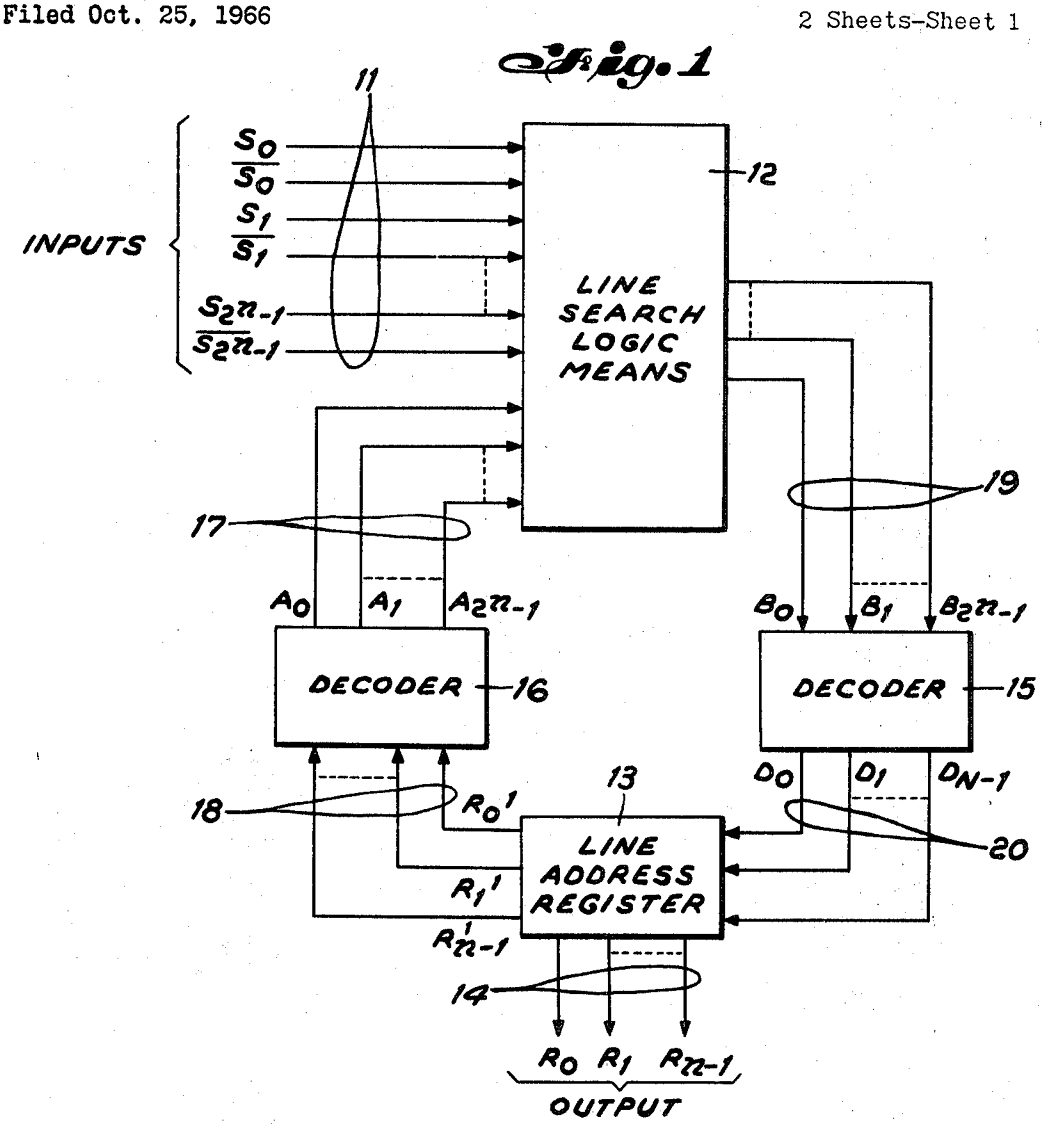
FIG. 1 is a schematic diagram of the line switching apparatus according to the invention.

Referring to FIG. 1, the arrangement according to the invention shows $2^n$ lines indicated by numeral 11. The service request line input signals are designated as $S_0$, $S_1$ and $S_{2^n-1}$. The complements of the service request signals are indicated by $\overline{S_0}$, $\overline{S_1}$ and $\overline{S_{2^n-1}}$, since it is presumed that both polarities of the service request signals are available, or can be readily generated by means of an inverter per service request line.

Lines 11 are fed to line search logic means 12 hereinafter described in connection with FIGS. 2 and 3. There is an $n$-stage line address register 13 which contains the binary address of the particularly data line 14 being serviced at any instance and indicated by $R_0$, $R_1$ and $R_{n-1}$. Between the register and the line search logic means there are two decoders, 15 and 16. Decoder 16 converts the $n$-bit code to a 1-out-of-$2^n$ signal, and decoder 15 converts from the 1-out-of-$2^n$ signal to the $n$-bit code.

At any particular instance one of the lines 17 indicated by $A_0$, $A_1$ and $A_{2^n-1}$ will be "one." It will correspond to the state of the line address register because lines 18 indicated by $R'0$, $R'1$ and $R'n-1$ will feed the particular information to decoder 16 so that the corresponding state of the register by means of lines 17 is fed to line search logic means 12. At this same time one of the lines 19, indicated by $B_0$, $B_1$ and $B_{2^n-1}$ will also be "one." It however will correspond to the next line requiring service and by means of lines 20 indicated by $D_0$, $D_1$ and $D_{n-1}$ will enable the register input gates to handle the next line requiring service.

For example, assume at a particular instance $t_1$, lines 3, 17, and 24 are requesting service, and further that line 17 is presently being serviced. This means that the line register 13 is in state 17 and lines 14 carry the number 17 in binary code. Now at this time $t_1$ only one of the lines 19 will be "one" ($B_{24}$ as it is the next line requiring service), and only one line 17 will be "one" ($A_{17}$ corresponding to the state of register 13). When the handling of line 17 is completed the register input gates will be enabled by means of a control signal from the terminal equipment, and the register will then contain the number 24 in binary code, causing lines 24 to be serviced.

Figure 2:
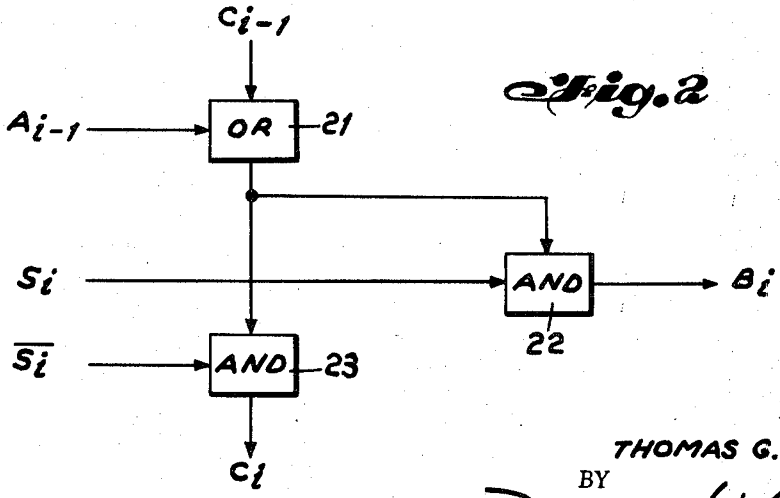
FIG. 2 is a typical stage of the line search logic means shown in FIG. 1.

The details of the line search logic are shown in FIG. 2. There are $2^n$ identical stages connected in a chain, only one stage being shown. The C*i* output signal is connected to the next stage and the input C*i*–1 from the preceding stage. The output signal from stage $2^n$–1 is connected to the input of stage 0. Each stage comprises an OR gate 21 and two AND gates 22, 23. The one A*i*–1 signal from decoder 16 will enter the chain at a particular point according tothe stage and is fed to respective OR gate 21. This signal will propagate through each succeeding stage for which the service request line S*i* is equal to "zero," that is, for which $\overline{Si}$ is equal to "one." However, when the $A_{i-1}$ signal reaches a stage for which the service request line S*i* is equal to "one," it will go no further, but will cause the corresponding $B_1$ signal to become "one."

It should be noted that if it should happen that no service request is "one" except the one being serviced at the present time, then the B signal will be the same number as the A signal.

Although this approach is considerably faster then the conventional approach as described previously, it can be improved further. Since the signal $A_{i-1}$, may have to propagate to a very long logic chain, which may take more than one clock time, a faster arrangement is shown in FIG. 3.

Figure 3:
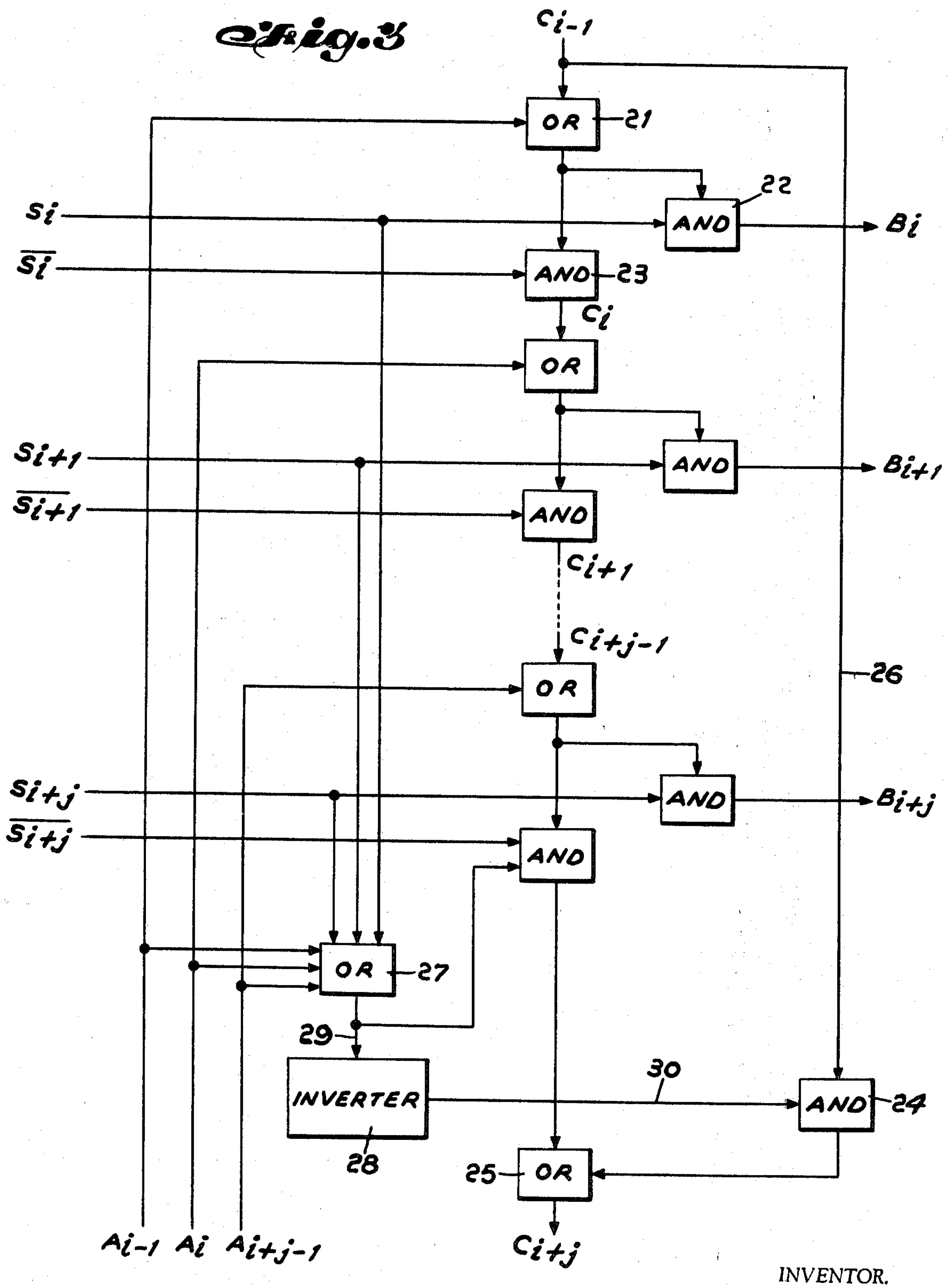
FIG. 3 is another embodiment of the invention as shown in FIG. 2.

As shown in FIG. 3 a group of *j* stages are so arranged that the signal from C*i*–1 to the group need only pass through one AND gate 24 and one OR gate 25 via line 26, instead of *j* AND gates and *j* OR gates. The individual stages indicated by 21, 22, and 23 are exactly the same as shown in FIG. 2. They are connected serially as previously mentioned. What has been added is the bypass AND gate 24, OR gates 25 and 27 and the inverter 28. OR gate 27 and inverter 28 comprise the control means to control bypass AND gate 24, so that the signal from C*i*–1 may pass via line 26 to bypass the individual stages comprising the group.

If the group includes the line currently being serviced, or if it includes one or more lines for which a service request is "on," then the bypass path 26 is inhibited. If none is included, then the bypass path 26 is enabled. For instance, if A*i*–1, A*i* or A*i*+*j*–1 is "one" then line 29 will be "one" and line 30 from inverter 28 will be "zero" and bypass AND gate 24 will be inhibited and the signal from C*i*–1 will progress through each stage as line 26 is in an open condition. Also, if any service request line S*i*, S*i*+1, and S*i*+*j* is in a "one" condition, line 29 will be in a one condition and line 30 from inverter 28 will be in a "zero" condition which will also inhibit bypass AND gate 24.

On the other hand, if the signals will neither originate or terminate in this group, bypass line 26 is enabled and the signal from C*i*–1 may proceed via line 26, bypass AND gate 24, and OR gate 25 to the next stage of the succeeding group.

In the use of this invention, suppose there were 64 service request lines, then the arrangement shown in FIG. 2 would involve a very long chain of 64 pairs of gates. However, if the arrangement of FIG. 3 is incorporated, and the group size comprises four stages, then the longest chain will involve four pairs in the originating group, four pairs in the terminating group, and 14 pairs in the bypass paths of the intermediate groups for a total of 22 pairs. As can be seen, this arrangement will require only one third the pairs and considerably reduce the time required for search.

The bypassing principle described herein in connection with FIG. 3 can easily be extended to provide a bypass around a number of groups, this would shorten the maximum path even more and would provide an even higher operating speed.

The foregoing has been described in terms of an application to a data transmission terminal. However, it could just as well be used in any application in which there are a large number of devices to be examined cyclically to determine which should receive attention next and where the average utilization of each device is small. Some other areas of application are telephone and telemetric apparatus.

I claim:

1. Line searching apparatus for use with lines having a service request line assocoiated with each data line comprising:

line search logic means connected to each service request line;

said logic means including a chain of identical stages, one stage for each service request line, and each stage having a pair of AND gates and an OR gate;

line address register means associated with the data lines for addressing the said data lines;

first decoding means interconnecting the said line search logic means and line address register means for indicating to the line address register the particular line next to be serviced; and second decoding means interconnecting the line search logic means and the line address register for indicating to the line search logic means which line is currently being serviced, whereby the successive service of lines is automatically accomplished in accordance with the incoming signals on the service request line and service request complement line without cycling through all of the service lines.

2. Apparatus according to claim 1, wherein a signal from said second decoding means will pass through each stage unless inhibited by a request condition on said service request line, and when said signal reaches a particular stage for which said request condition is "on," an output signal from said particular stage is fed to the first decoding means to identify the particular line next to be serviced.

3. Apparatus according to claim 2, wherein the output of said OR gate is serially connected to each of said AND gates and the input of said OR gate is connected to both a preceding stage and said second decoder means, one of said AND gates having an input connected to said service request line and its output connected to said first decoding means, and the other of said AND gates having a complementary input connected from said service request line and its output connected to a succeeding stage whereby said signal from said second decoding means will activate said one AND gate when the request condition exists on said service request line and will activate said other AND gate when the request condition does not exist on said service request line.

4. Apparatus according to claim 3, wherein a plurality of stages forms a group including a bypass AND gate, a group connecting OR gate, and means for controlling said bypass AND gate, such that said control means will enable said bypass AND gate when the request condition and the signal from said second decoding means does not exist on any stage of said group.

5. Apparatus according to claim 4, wherein one input of said bypass AND gate is connected to the group connecting OR gate of a preceding group and the other input of said bypass AND gate is connected to said controlling means, and the output of said bypass AND gate is connected to its associated group connecting OR gate, so that when said bypass AND gate is enabled, each stage of the associated group is bypassed.

6. Apparatus according to claim 5 wherein said controlling means comprises:

a control OR gate having input connections to each service request line and input connections from said second decoding means associated with said group; and the output of said control OR gate being connected to an inverter and to the last stage AND gate of said group, whereby the output of said inverter is connected to said bypass AND gate, to inhibit said bypass AND gate on either the request condition existing on any associated service request line, or the signal from said second decoding means being present at the input of said control OR gate.

7. Line searching apparatus comprising:

line search logic means having a multiplicity of input service request and service request complement lines;

said search logic means includes a chain of identical stages, one stage for each service request and service request complement line, and each stage having a pair of AND gates and an OR gate;

line address register means for addressing one of a multiplicity of data lines according to a request condition existing on one of said service request lines;

first decoder means interconnecting said logic and register means, said first decoder means to indicate to said register means the next service request line to be serviced; and second decoder means interconnecting said logic and register means for indicating to said logic means the particular service request line being serviced, whereby the service of said service request lines in the request condition is automatically accomplished according to the arrangement of said logic means.

8. Apparatus according to claim 7, wherein a signal from said second decoding means will pass through each stage unless inhibited by the request condition existing on the associated service request line, and when said signal reaches a particular stage for which said request condition is "on," an output signal from said particular stage is fed to the first decoding means to identify the particular line next to be serviced.

9. Apparatus according to claim 8, wherein a plurality of stages forms a group, each group further including a bypass AND gate, a group connecting OR gate, and means for controlling said bypass AND gate, such that said control means will enable said bypass AND gate in the absence of all signals to said group.

10. Apparatus according to claim 9, wherein said controlling means comprises a control OR gate having input connections to each service request line and input connections from said second decoding means associated with said group; and the output of said control OR gate being connected to an inverter and to the last stage AND gate of said group, such that the output of said inverter is connected to said bypass AND gate, to inhibit said bypass AND gate on the presence of any signal to said group.

11. Apparatus according to claim 10, wherein said bypass AND gate is connected between said group connecting OR gate and a preceding group connecting OR gate to form a bypass path around said group, such that when said bypass path is enabled, a path through said chain of identical stages is inhibited, and when said bypass path is inhibited the path through said chain of identical stages is enabled.

References Cited

UNITED STATES PATENTS

| | | | |
|---|---|---|---|
| 3,133,267 | 5/1964 | White | 340—147 |
| 3,428,947 | 2/1969 | Macurdy | 340—147 |

THOMAS A. ROBINSON, Primary Examiner

U.S. Cl. X.R.

178—3; 179—18